Oct. 29, 1957  H. J. BEATTY  2,811,041
FLUID SAMPLER
Filed June 3, 1955  2 Sheets-Sheet 2
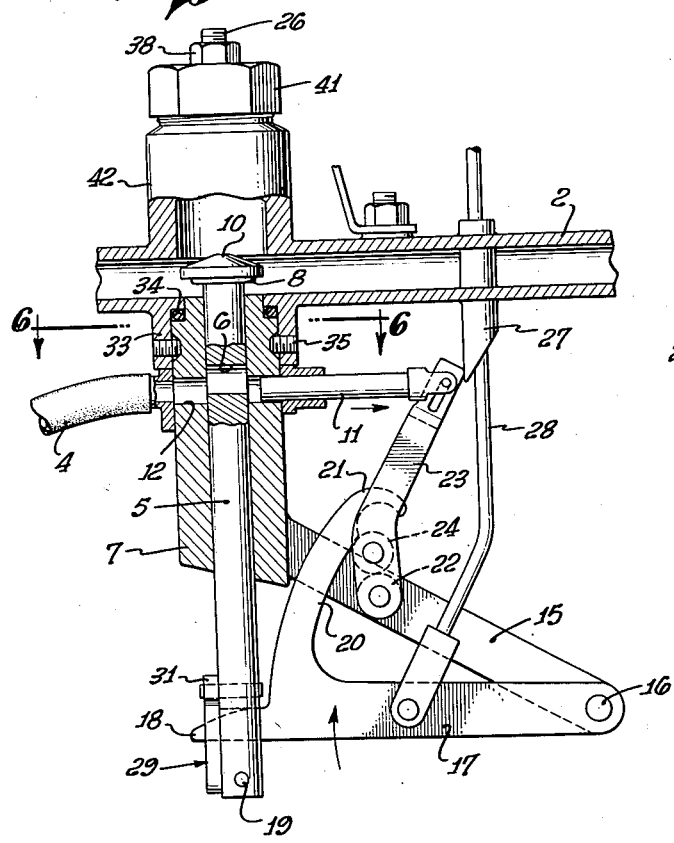
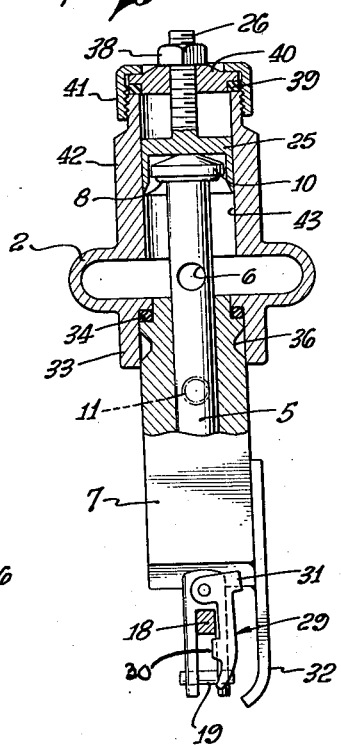
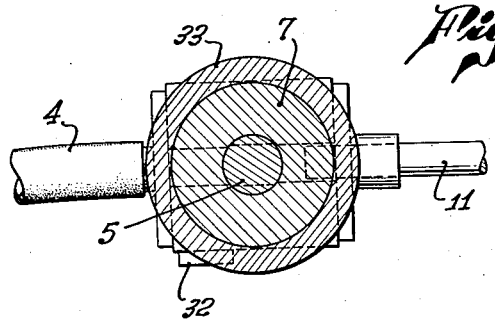
INVENTOR.
HAROLD J. BEATTY,
BY
Delmar H. Jansen
AGENT.

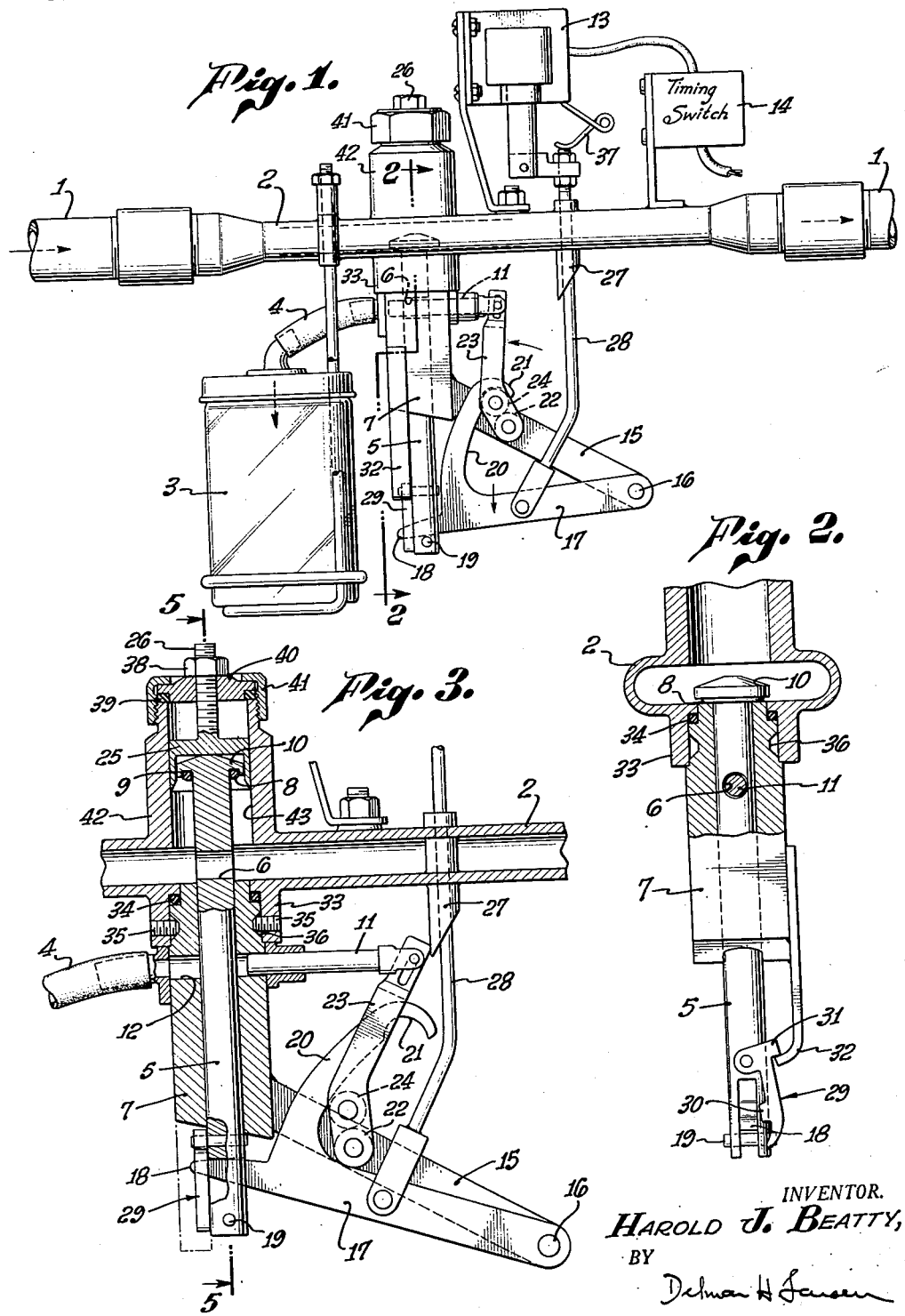

United States Patent Office 2,811,041
Patented Oct. 29, 1957

2,811,041
FLUID SAMPLER
Harold J. Beatty, Coalinga, Calif.
Application June 3, 1955, Serial No. 512,954
3 Claims. (Cl. 73—422)

This invention relates to samplers for fluids, and more particularly for fluids, especially liquids, contained in pipelines and other conduits.

In many fields of technology, it is desirable and necessary to obtain a sample which is truly representative of a larger quantity of material which may be contained in a tank or be traversing a pipeline. A particular application is that of a liquid, or a mixture of liquids and gases, travelling in a conduit such as a pipeline. Even more particularly, crude oil from a well which is travelling through a collecting line into a receiving tank needs to be sampled in order to determine the makeup of the liquid traversing the pipe. It is common in oil field installations to provide for a fluid sampler so that periodically, for example, daily, a small sample of a pint or quart may be collected truly representative of the material which is passed through the pipe during the sampling interval.

A number of problems arise in samplings of this type. For example, the fluid may consist of a mixture of two immiscible liquids such as oil and water, and the sampler may by reason of its emplacement or construction be selective as to one liquid or the other. Again, during the night when the temperature drops and the liquid thickens, which particularly happens in oil field installations, samplers of many common designs may take a smaller sample than is accomplished when the liquid is at a higher mobility. Indeed, particular problems are presented by very thick oils under wintertime conditions, when flow through a pipe is barely possible.

An object of the invention is to provide a fluid sampler having positive and invariant sampling action.

Another object of the invention is to provide a sampler which will remove, or thief, the same quantity of liquid for each sampling cycle regardless of the composition or the viscosity of the liquid to be sampled, or of its rate of flow through the conduit or pipe, or of the frequency at which sampling is performed.

Another object of the invention is to provide a sampler which can accomplish all of the above objects and yet is actuated by a simple reciprocating motion, such as may be accomplished by solenoid action.

Other objects of the invention will become apparent as the description thereof proceeds.

In the drawings,

Fig. 1 shows a general view of my apparatus as installed in a pipeline. More particularly, the sampler is in the discharge position.

Fig. 2 shows a cross-section of a portion of the sampling mechanism taken through the section indicated by the dashed lines of Fig. 1.

Fig. 3 is a detailed view of the sampling mechanism, partly in cross-section, and shows the sampler in its sampling or thieving position.

Fig. 4 shows the sampling mechanism just after the start of the sampling cycle.

Fig. 5 is a sectional view taken along the section indicated by the dashed lines in Fig. 3.

Fig. 6 is a sectional view taken along the section indicated by the dashed lines in Fig. 4.

Referring now to Fig. 1, 1 denotes a pipeline carrying fluid to be sampled. Inserted in pipeline 1 is a section of pipe 2 which is conveniently flattened for most of its length, except at its ends where it makes connection with the pipe which may be of conventional circular cross-section. I have found the flattening of pipe 2 especially desirable to create turbulence and mixing of the fluid traversing pipeline 1 so that a representative, or "mixed up" sample of fluid is obtained by the thief, to be more particularly described below. I have further found that the degree of flattening necessary is such that the ratio of internal width of the pipe after flattening to internal height is greater than about four to one; that is the height is less than about one-quarter the width. Flattening in a ratio of more than about twelve to one, however, unduly restricts flow. A removable container 3 is provided to receive the individual portions of fluid sampled, for periodic collection, and is connected with the sampling mechanism proper by a flexible tube 4.

In brief, my invention contemplates the provision of a sampling rod 5 which is capable of being placed in two positions, a sampling position and a discharging position. For convenience in description, the sampling mechanism is shown as depending in a generally vertical fashion from the pipe section 2, although it will be understood that in view of the positive action of the sampling mechanism, any position relative to horizontal may be taken by the device. Nevertheless, in its usual disposition as shown in the figures, the sampling position of sampling rod 5 corresponds to its upper position, as shown for example particularly in Fig. 3; and the discharging position of the sampling rod 5 corresponds to a lower position, as shown for example in Fig. 1. Briefly then, when in its upper or sampling position, the sampling rod 5 occupies a relatively small portion of the cross-sectional area of the pipe section, as may be seen especially in Fig. 5; and the portion of sampling rod 5 crossing the axis of the pipe section 2 is penetrated by a hole 6, the axis of which is parallel with and more or less coincident with the axis of pipe section 2. Accordingly, when in this upper or sampling position, any fluid traversing pipe section 2 will also traverse hole 6. From this sampling position, the sampling rod 5 with the hole 6 now full of fluid from the pipe section 2 is reciprocated to its lower, or discharging position, as shown in Figs. 1 and 2. In this position, escape of fluid from pipe section 2 is prevented by the tight fit of sampling rod 5 in guide tube 7; and this seal is made positive and absolute by an O-ring 8 contained in an annular recess 9 forming part of the cap portion 10 of sampling rod 5, this ring seating against the upper portion of guide tube 7 in the fashion evident particularly in Fig. 2. After the sampling rod 5 has reached its lower, or discharging position, the hole 6 is purged of its content of fluid by the insertion therethrough of a purge rod 11. This action is made possible by the provision of a corresponding hole 12 in guide tube 7. The fluid thus purged travels through flexible tube 4 into container 3. A new sampling cycle is initiated by a series of consecutive steps, the first of which is a removal of purge rod 11 laterally so that it clears hole 6 in sampling rod 5; followed by the reciprocation of the sampling rod 5 to its upper or sampling position, in which the hole 6 therein becomes filled with fluid; the reciprocation of sampling rod 5 to its lower or discharge position, and finally the lateral movement of purging rod 11 through holes 6 and 12 so as to discharge the fluid once more into the container 3.

I have provided a mechanical assembly for accomplishing the series of steps described which has the particular feature that it may be actuated by a single reciprocating motion. The reciprocating motion may be motivated by any power means desired. The exact power means is obviously thus not essential. Reciprocating motion may be taken from a pump rod on a well; from a chemical feeder pump, or the like. I prefer, however, for ease of installation a solenoid actuator as is depicted in Fig. 1, wherein 13 denotes a solenoid which is electrically connected to a timing switch 14 which in turn is connected to a source of electrical power, not shown. By adjustment of the timing switch 14, which may be of conventional design, the solenoid 13 may be caused to actuate the sampling mechanism as often as desired.

Coming now to the particular mechanism assembly shown in the drawings for operating the sampling cycle which has been described, in Figs. 1, 3, and 4, 15 denotes a support bar which is fixed in position with relation to guide tube 7 and pipe section 2. This is most conveniently accomplished by welding or bolting support bar 15 to the lower portion of guide tube 7, as is evident from the drawings. Support bar 15 carries a pivot pin 16 about which is pivoted a lever 17. Lever 17 has a prong portion 18 which engages the lower end of sampling rod 5 by means of a slot and pin 19 in sampling rod 5. Lever 17 also bears an arcuate cam portion 20 terminating in a hook portion 21.

Also borne by support bar 15 by means of another bearing pin 22 is a link 23, which actuates purge rod 11. Link 23 carries a roller 24 which is engaged by both the arcuate portion 20 and the hook portion 21 of lever 17. The action of link 23 in moving the purge rod 11 back and forth as required by the sampling cycle may be seen by observing the position of link 23 in the purging portion of the sampling cycle as depicted in Fig. 1. Here the roller 24 of link 23 is engaged snugly by the hook portion 21 of lever 17. When a sampling cycle is initiated by an upward motion of lever 17, the initial upward motion of lever 17 draws link 23 out by engagement of the roller 24 thereof with the arcuate cam portion 20, more particularly that portion where the arc meets the hook portion 21. The action thus imparted to link 23 pulls the purge rod 11 out of engagement with hole 6; and this is done before lever 17 has travelled upwards to such an extent that the prong portion 18 thereof contacts the top of the slot in the bottom of rod 5, and therefore before the lever 17 starts to push up the sampling rod 5. As upward movement of lever 17 is continued, prong portion 18 thereof engages sampling rod 5 and pushes it upward. This action terminates when the cap portion 10 of sampling rod 5 meets upper stop 25.

The position of upper stop 25 is adjustable by means of a screw 26 integral therewith, which is threaded through a mounting disk 40. The mounting disk is secured to the upper portion of the sampling rod housing 42 by a threaded flange 41. A gasket 39, conveniently of leather, furnishes a liquid seal. A lock nut 38 secures the position of a screw 26 and therefore upper stop 25 when it has been properly positioned, so that hole 6 is approximately central in pipe portion 2. It will be noted as is especially apparent from the sections shown in Figs. 3 and 5, that some side clearance is provided by the cap portion 10 of sampling rod 5 and the inner wall of the stop 25. Since the stop 25 will normally become more or less filled with fluid flowing in the pipe portion 2, this relatively small clearance serves to cushion the upward movement of cap portion 10 particularly at the terminal portion of its upward travel as it pushes into stop 25.

After link 23 has been drawn out by the initial upward movement of lever 17, roller 24 engages the long arcuate portion 20 but this arc has pivot pin 16 as a center, so that link 23 is not moved during the balance of the upward travel of rod 5. Any excessive outward movement of link 23 which might result in pulling purge rod 11 completely out of hole 12 is prevented by a stop 27. I have found it convenient to provide at this point a tubulation entirely traversing the section of pipe 2 without communicating with the interior therewith which serves as a passageway for actuating rod 28. This tubulation is likewise the stop 27, by reason of its emplacement.

Returning now to the balance of the sampling cycle, when the actuating rod 28 has pulled lever 17 to its upper or sampling extremity, the actuation in that direction then ceases, as may for example be brought about by suitable action of the timing switch, and reciprocation of the lever 17 begins in the opposite, or downward direction. However, when rod 5 is in its upward position, a toggle 29 attached thereto falls by gravity into the vertical position shown in Fig. 5, so that prong portion 18 in its downward travel engages projection 30 on toggle 29 rather than pin 19. This enables rod 5 to be brought to its lower, or discharge position while roller 24 is still engaged by the arcuate portion 20 of lever 17, and thus before any movement of link 23 has begun. Towards the very end of the downward travel of prong portion 18 of lever 17, it is freed of engagement with projection 30 by the tripping of toggle 29 by contact of another projection 31 thereon with tripping bar 32, fixed with respect to the guide tube 7. After toggle 29 is thus tripped by tripping bar 32 and lever 17 continues its downward travel, roller 24 of link 23 is engaged by hook portion 21 of lever 17, whereupon the roller 24 is pulled downward and purge rod 11 is moved horizontally through holes 6 and 12 so as to complete the sampling cycle.

I have found it convenient to provide guide tube 7 in the form of a solid block of metal, for example brass or steel, with an upper portion turned to circular shape so as to fit a support boss 33 welded to pipe portion 2. An O-ring 34 forms a liquid-tight seal, and guide tube 7 is fixed in position conveniently by set screws 35 which engage an annular recess 36 in the upper portion of guide tube 7.

A wide variety of materials of construction is available. Pipe portion 2 will generally be of steel, although other metals such as stainless steel, brass and the like may be used. Ordinary cold rolled steel is suitable for such portions of the apparatus as rods 5 and 28, support bar 15, lever 17, and link 23, and the like; although these may be made of stainless steel, particularly where corrosion is a factor. Purge rod 11 may be made of metal, although I have found plastic to be particularly suitable. I have used a phenol-formaldehyde impregnated fabric rod obtainable under the trade-name of "Micarta" with success here; solid nylon may also be used. The combination of a plastic rod in a metal guide tube is particularly successful from the standpoint of very slight wear during long periods of operation. The O-rings used are of a suitable elastomer such as a synthetic rubber. Where the sampling mechanism is set up in a generally vertical fashion, depending downward from a horizontally disposed pipe portion 2 as has been depicted in the drawings, then I have found that the solenoid need pull only in an upward direction, the weight of all associated parts, such as the armature of the solenoid, the actuating rod 28, and the lever 17 and the rest, furnishing sufficient downward pull so as to complete the sampling cycle by gravity alone. Where it is particularly desired, these parts may be made sufficiently heavy so as to provide any desired weight; or a compression spring 37 may be provided at any convenient point, as shown for example in Fig. 1, in order to insure positive return action from the sampling to the discharging part of the cycle. Such a spring is of course used whenever an arrangement other than vertical is employed for the sampler.

It will be appreciated that the invention is a broad one, and numerous modifications and changes may be made within its broad scope, and the scope of the claims which are appended hereto.

What I claim is:

1. In a fluid sampling device, a pipe carrying fluid to be sampled; a guide tube attached to and communicating with the interior of said pipe; a sampling rod slidably engaged by said guide tube and having a cap portion penetrating into the interior of said pipe, and slidably movable between a sampling position and a discharging position with respect to said guide tube; a transverse hole in said sampling rod at a point within said pipe when said sampling rod is in said sampling position; a transverse hole in said guide tube coaxial with said hole in said sampling rod when said sampling rod is in said discharging position; a purge rod positioned in said hole in said guide tube and slidably movable through said hole in said sampling rod; lever means for reciprocating said purge rod; lever means for reciprocating said sampling rod; and cam means operatively connecting said sampling rod lever means and said urge rod lever means so as to move said purge rod into a purging position at one extremity of reciprocation of said sampling rod and to withdraw said purge rod from said purging position upon reversal of motion of said sampling rod lever means at the same extremity of reciprocation thereof.

2. In a fluid sampling device, a pipe carrying fluid to be sampled; a guide tube attached to and communicating with the interior of said pipe; a sampling rod slidably engaged by said guide tube and having a cap portion penetrating into the interior of said pipe, and slidably movable between a sampling position and a discharging position with respect to said guide tube; a transverse hole in said sampling rod at a point within said pipe when said sampling rod is in said sampling position; a transverse hole in said guide tube coaxial with said hole in said sampling rod when said sampling rod is in said discharging position; a purge rod positioned in said hole in said guide tube and slidably movable through said hole in said sampling rod; lever means for reciprocating said purge rod; lever means for reciprocating said sampling rod; toggle means attached to said sampling rod and positioned so as to engage said lever means at one extremity of reciprocation of said sampling rod and so as to release said lever means before reaching the other extremity of reciprocation of said sampling rod; and cam means operatively connecting said sampling rod lever means and said purge rod lever means so as to move said purge rod into a purging position at one extremity of reciprocation of said sampling rod and to withdraw said purge rod from said purging position upon reversal of motion of said sampling rod lever means at the same extremity of reciprocation thereof.

3. In a fluid sampling device, a conduit carrying fluid to be sampled; a flattened pipe forming a part of said conduit and having an internal height of less than about one-quarter its internal width but not less than about one-twelfth its internal width; a guide tube attached to and communicating with the interior of said pipe; a sampling rod slidably engaged by said guide tube and having a cap portion penetrating into the interior of said pipe, and slidably movable between a sampling position and a discharging position with respect to said guide tube; a transverse hole in said sampling rod at a point within said pipe when said sampling rod is in said sampling position; a transverse hole in said guide tube coaxial with said hole in said sampling rod when said sampling rod is in said discharging position; a purge rod positioned in said hole in said guide tube and slidably movable through said hole in said sampling rod; lever means for reciprocating said purge rod; lever means for reciprocating said sampling rod; toggle means attached to said sampling rod and positioned so as to engage said lever means at one extremity of reciprocation of said sampling rod and so as to release said lever means before reaching the other extremity of reciprocation of said sampling rod; and cam means operatively connecting said sampling rod lever means and said purge rod lever means so as to move said purge rod into a purging position at one extremity of reciprocation of said sampling rod and to withdraw said purge rod from said purging position upon reversal of motion of said sampling rod lever means at the same extremity of reciprocation thereof.

References Cited in the file of this patent
UNITED STATES PATENTS

| | | |
|---|---|---|
| 1,966,712 | Fisher et al. | July 17, 1934 |
| 2,012,836 | Talbot et al. | Aug. 27, 1935 |
| 2,217,855 | Bassler | Oct. 15, 1940 |
| 2,516,097 | Woodham et al. | July 18, 1950 |